(12) United States Patent
Podbelsek et al.

(10) Patent No.: US 9,993,007 B1
(45) Date of Patent: Jun. 12, 2018

(54) THREE-PART ICE CREAM CONES

(71) Applicants: Alix Rose Podbelsek, Highland Park, IL (US); Jake Podbelsek, Highland Park, IL (US)

(72) Inventors: Alix Rose Podbelsek, Highland Park, IL (US); Jake Podbelsek, Highland Park, IL (US)

(*) Notice: Subject to any disclaimer, the term of this patent is extended or adjusted under 35 U.S.C. 154(b) by 39 days.

(21) Appl. No.: 14/932,713

(22) Filed: Nov. 4, 2015

Related U.S. Application Data

(60) Provisional application No. 62/076,148, filed on Nov. 6, 2014.

(51) Int. Cl.
 *A21D 13/00* (2017.01)
(52) U.S. Cl.
 CPC ..... *A21D 13/0029* (2013.01); *A21D 13/0087* (2013.01)
(58) Field of Classification Search
 CPC ........................................... A21D 13/00
 USPC ................................. 426/139, 138
 See application file for complete search history.

(56) References Cited

U.S. PATENT DOCUMENTS

| | | | | |
|---|---|---|---|---|
| 414,590 A | * | 11/1889 | Cole | ............... E05B 65/0007 16/257 |
| 426,367 A | * | 4/1890 | Gale | .................. D06F 15/00 68/75 |
| 1,794,238 A | | 2/1931 | Mckibben | |
| 1,938,113 A | | 12/1933 | Schoenfeld | |
| 2,527,993 A | | 10/1950 | Habler | |
| 4,104,405 A | | 8/1978 | Forkner | |
| 5,425,527 A | | 6/1995 | Selbak | |
| 6,235,329 B1 | | 5/2001 | Grigoli et al. | |
| 2013/0251859 A1 | * | 9/2013 | Daouse | ............... A23P 20/18 426/94 |

FOREIGN PATENT DOCUMENTS

| | | |
|---|---|---|
| CN | 201398408 | 2/2010 |
| CN | 102406046 | 4/2014 |
| FR | 2775264 A | 8/1999 |
| WO | 2003013265 | 12/2003 |

* cited by examiner

*Primary Examiner* — Lien T Tran
(74) *Attorney, Agent, or Firm* — Lesley A. Wallerstein, LLC

(57) ABSTRACT

We disclose an ice cream cone with three, and optionally four, completely edible, interchangeable and customizable flavor and texture components. The cone comprises a wafer, a handle to be inserted into and through the wafer, and an edible adhesive joining the wafer to the handle. Ice cream or another comestible is surrounded by the wafer and supported from beneath by a flat top surface of the handle and optional handle topper.

12 Claims, 7 Drawing Sheets

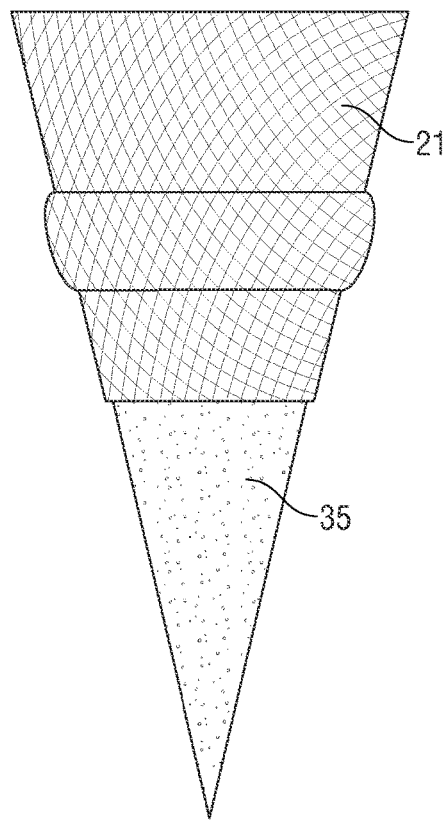
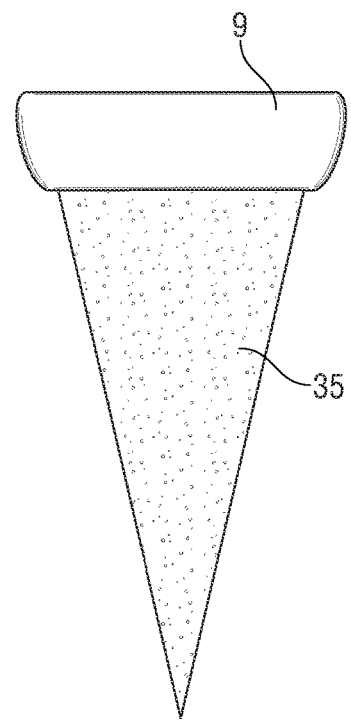
FIG. 10    FIG. 11
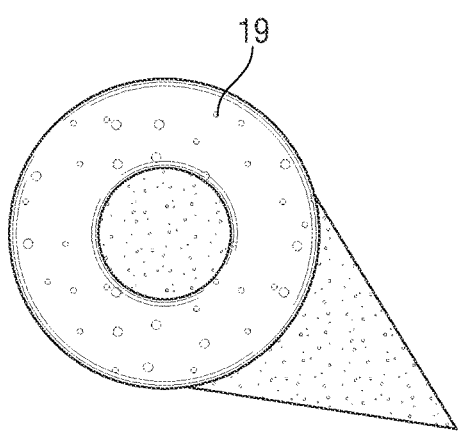
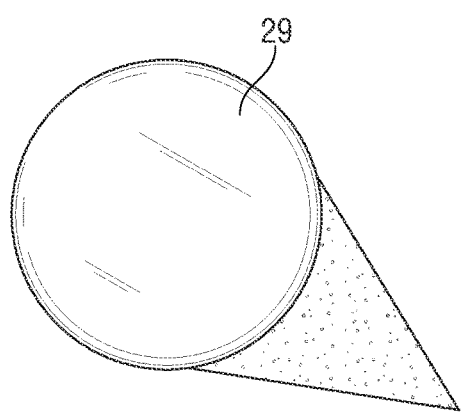
FIG. 12    FIG. 13

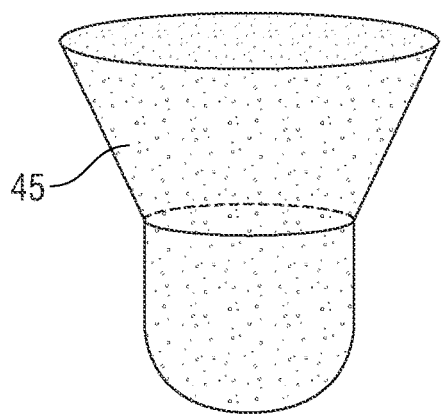
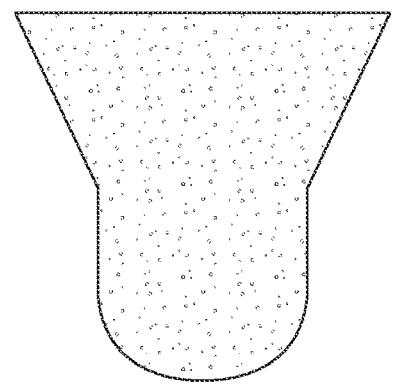
FIG. 14    FIG. 15
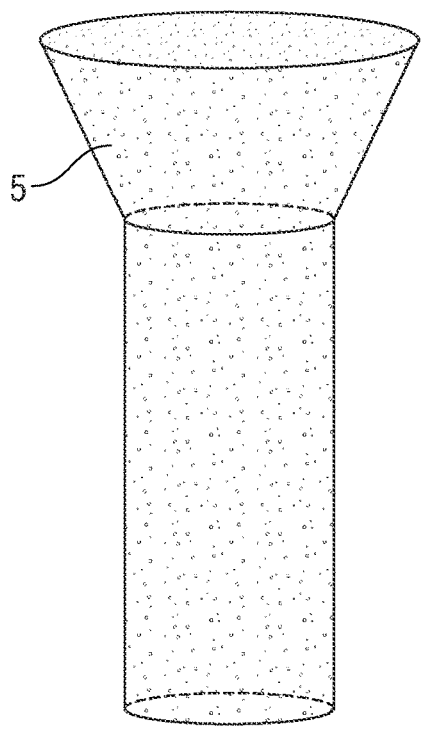
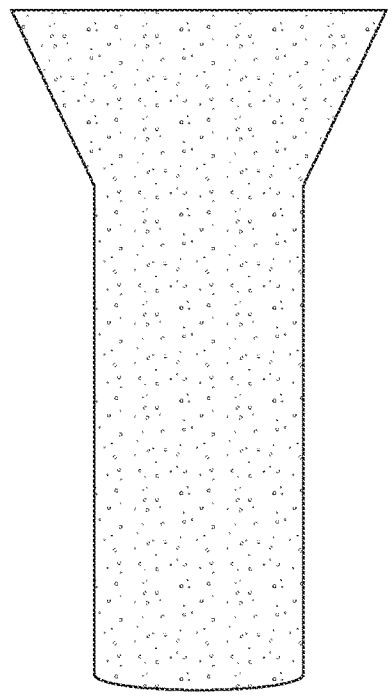
FIG. 16    FIG. 17

THREE-PART ICE CREAM CONES

CROSS-REFERENCE TO RELATED APPLICATION

This application claims priority to U.S. Provisional Patent Application 62/076,148, filed Nov. 6, 2014.

STATEMENT REGARDING FEDERALLY SPONSORED RESEARCH OR DEVELOPMENT (not applicable)

NAMES OF PARTIES TO A JOINT RESEARCH AGREEMENT (not applicable)

REFERENCE TO SEQUENCE LISTING, A TABLE OR A COMPUTER PROGRAM LISTING COMPACT DISC APPENDIX (not applicable)

FIELD OF THE INVENTION

This invention relates to edible and assemble-it-yourself ice cream supports.

BACKGROUND OF THE INVENTION

Ice cream cones are not new. They let us hold the scoop without a cup and eat it without a spoon. We love ice cream, and we love eating ice cream from a cone. But most of the time the cone gets soggy as the ice cream melts. Then the ice cream melts through and drips all over our hands and clothes. It can get very messy.

There are so many different flavors of ice cream today. Besides basic vanilla and chocolate, you can have candy, cookies, bubble gum and sauces mixed right in. You can add salty things, too, like nuts, pretzels and sea salt. You can add spices like hot peppers, cloves, and cinnamon. People even make ice cream with sweet corn, blackberries, roasted strawberries and buttermilk. In some places, you can actually use liquid nitrogen to make ice cream on the spot. There are so many different kinds of ice cream cones typically come in three different kinds: sugar wafers, cake cones and waffle cones. Sure, you can flavor or color the cones or dip the cones in chocolate, but compared to ice cream, cones are pretty boring.

As much as we love ice cream, we also love cookies, chocolate bars, candy and spreadable sweets, too. We thought it would be delicious and fun to put them together into one treat. Sugar cones are thin, light, crispy, and not too sweet. Cookies are thick, crunchy and last a long time. Hard candy is sweet, does not melt and lasts a long time, too. Some hard candy you can bite into, like chocolate. Other hard candy you have to lick. Chocolate syrup, frosting, marshmallow fluff, caramel, peanut butter and jelly are sticky and gooey. We spread and pour them on bread, on ice cream, and on cookies, too. We like them on anything.

BRIEF DESCRIPTION OF THE INVENTION

We invented an ice cream cone that has all of our favorite sweet treats in one: ice cream, wafer, crunchy cookie, frosting, jelly and so much more. No one has ever made this before. The top part of the ice cream cone looks like the same cone you would see in an ice cream shop, but with the bottom cut off. Instead of a cone bottom, we created and dropped in a specially shaped cookie or candy. Part of this cookie sits inside the cone and becomes the bottom; part comes out through the hole in the bottom and makes a handle. You could also mold hard candy into this same shape. The top of the cookie or candy is hidden inside the cone, but the bottom is visible below. The bottom makes a handle that is big enough to hold in one hand. Because it is a solid cookie or candy, you can grip it hard and it won't break. The ice cream will not drip through the cookie or candy, either. A cookie will stay crunchy much longer than a regular ice cream cone. You can use any cookie flavor: sugar, peanut butter, chocolate chip, oatmeal raisin, snickerdoodle, reverse chocolate chip. You can also use cookie-like toasted rice cereal-marshmallow treats, granola bars, or any hard candy, soft candy, or solid chocolate that holds its shape at room temperature. There are so many different choices.

We have created an ice cream cone with three, and an optional fourth, edible components to mix and match into an infinite variety of shape, flavor and texture combinations. There is first a hollow wafer which comes in at least two shapes. The first wafer shape is a simple right cone truncated at the apex. The wafer has a vertical central axis, a wider, upper opening, a narrower, lower opening and an interior lateral surface. The second wafer shape takes the simple truncated cone, and extends the narrower, lower opening into a hollow cylindrical neck extending vertically therefrom. The wafer may be flavored, colored, or left plain.

The second component is a solid, and not hollow, handle which is ed into and snugly fills the wafer. The handle essentially has two portions. An upper portion is cone shaped and dimensioned to snugly fit within the conical interior space of the wafer. The upper portion of the handle has a circular platform and an exterior lateral surface. The exterior lateral surface of the handle mates with and nests against the interior lateral surface of the wafer. The handle does not completely fill the interior space within the wafer. Instead, and by design, the circular platform of the handle rests below the wider, upper opening of the wafer. This exposes a rim of the interior lateral surface of the wafer. How tall of a rim can be varied by a person of ordinary skill in the art. The platform, plus the exposed interior lateral surface of the wafer creates an enclosure for a scoop of ice cream. The circular platform supports the ice cream from beneath, and the interior lateral surface of the wafer extending above the plane of the platform supports the ice cream around its circumference. Because the handle nests completely against the wafer, melted ice cream cannot leak.

A lower portion of the handle passes through the narrow, lower opening of the wafer and extends therebeyond. The handle can extend in the shape of a cylinder, a cone, or a cylinder which tapers to a cone. The handle is made of cookie or candy and is dimensioned to permit a person to hold it.

If the wafer having the cylindrical neck is being used, the handle is shaped to snugly fill both the conical and the cylindrical portions of the wafer. In either embodiment, the handle has a lower half which extends beyond and below the wafer, dimensioned to allow a person to grasp. We disclose five embodiments of the handle shape.

Third, there is an edible and spreadable adhesive which is spread between the wafer and the handle wherever they touch. The adhesive is applied at the junction between the interior lateral surface of the wafer and the exterior lateral surface of the handle. The adhesive is also applied within the cylidrical neck component, if that embodiment is made. The adhesive further seals the junction between the handle and the wafer, preventing melting ice cream from leaking. Preferably, the adhesive comprises chocolate syrup, caramel, frosting, peanut butter, jelly or marshmallow fluff, but any similarly textured edible confection can be substituted and still remain within the scope of this invention. Optionally, we disclose an edible topper which rests atop the handle platform. This topper can be marshmallow, gummy candy or other similarly textured confection. This adds yet more flavor and texture.

The ice cream scoop cannot fall out, and it cannot drip, because it is supported and surrounded by the wafer and the circular platform of the handle. There should not be any space between the wafer and the handle, but if there is, then the adhesive will seal any such gaps. When an ice cream scoop or other food is in place, you cannot see the top of the handle—it is hidden behind the wafer. You have to hold the handle to eat the cone.

You can use the cone to hold not only ice cream, but gelato, sorbet, sherbet, frozen yogurt, and ice milk. You could even use the cone to hold non-frozen treats like cotton candy, pudding, cheesecake and whipped cream, or savory foods like cheese.

BRIEF DESCRIPTION OF THE DRAWINGS

FIG. 10 is a front view of a fourth embodiment of a three-part cone, fully assembled.

FIG. 11 is a front view of a handle with the optional topper.

FIG. 12 is a top view of a handle with a first embodiment of the optional topper.

FIG. 13 is a top view of a handle with a second embodiment of the optional topper.

FIG. 14 is a perspective view of a fourth embodiment of the handle.

FIG. 15 is a front view of the handle shown in FIG. 14.

FIGS. 16 and 17 are a perspective and front view, respectively of the first embodiment of the handle.

Figure 3:
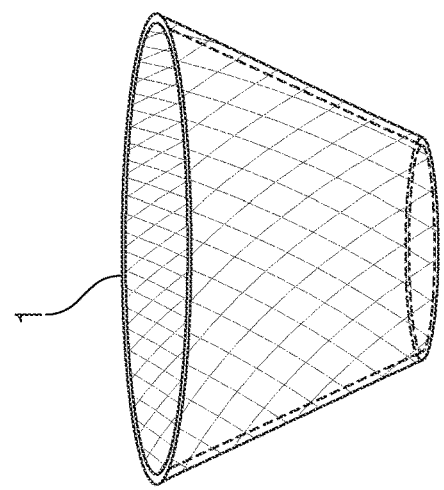
FIG. 3 is a perspective view of a second embodiment of the wafer.

REFERENCE NUMBERS 1 wafer, first embodiment
5 handle, first embodiment
7 edible adhesive
8 optional indicia
9 handle topper
11 wafer, second embodiment
15 handle, second embodiment
19 handle, ring embodiment
21 wafer, third embodiment
25 handle, third embodiment
29 handle topper, disk embodiment
35 handle, fourth embodiment
45 handle, fifth embodiment
100 ice cream support assembly

DETAILED DESCRIPTION OF THE INVENTION

Figure 1:
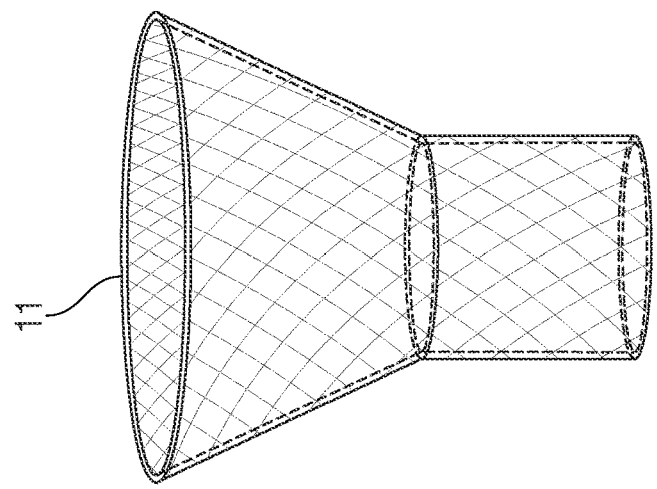
FIG. 1 is a perspective view of a first embodiment of the wafer.

FIG. 1 shows a first embodiment of wafer 1. The wafer preferably comprises what is commonly known in the industry as a "sugar cone." Unlike a conventional ice cream sugar cone, this wafer is truncated as it narrows, so it is open at the bottom. The wafer has a wider, upper opening, and a narrower, lower opening, and an interior lateral surface defining an interior space about a vertical, central axis. Preferably, the wafer is thin and baked into a crispy, cracker-like texture, with or without an embossed waffle texture, but other textures can be used and still be within the scope of this invention. The upper opening of the cone preferably forms a circle and has a diameter preferably sized to accept a single ¼ cup scoop of ice cream, approximately three inches across, although larger or smaller sized wafers, and other cross sections, such as oval or square, are within the scope of this invention.

Figure 20:
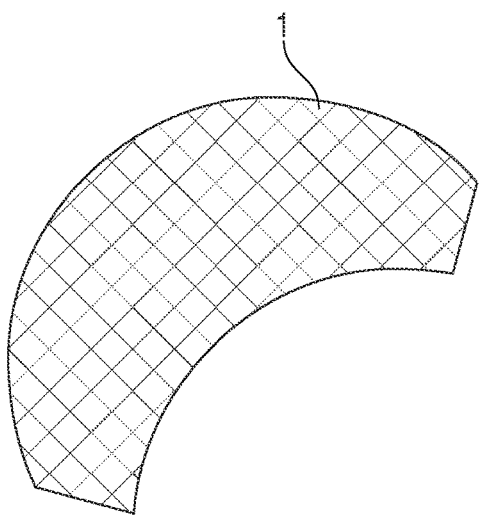
FIG. 20 is a front view of FIG. 1, in the open and flat configuration, before shaping
Figure 21:
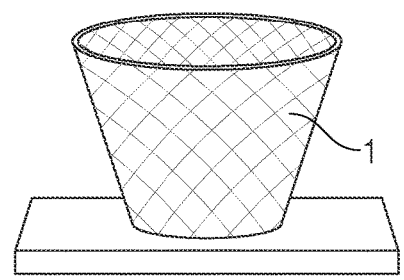
FIG. 21 is a perspective view of a first embodiment of the wafer, showing cooling on a rack

Wafers 1, 11 and 21 are baked in a custom mold, preferably flat, but also in three-dimensions, or in a continuous sheet and cut, either in an oven or in a dedicated waffle iron. Recipes for wafer batter are common and well known to those skilled in the art. Optionally, color and flavor can be added to the wafers, without affecting their ability to be shaped or hardened. As an example, wafer 1 while still in the flat configuration, before being shaped, is shown in FIG. 20. It is baked until warm and pliable. While still soft, the wafer can be shaped around a three-dimensional template, not shown. The wafer is rolled around the template as it hardens and cools into the desired shape. The wafer is removed from the template for assembly into a completed cone.

FIG. 3 shows a second wafer embodiment 11. Wafer 11 is identical to the simple truncated cone of FIG. 1, but has a hollow cylinder neck continuous with and depending from the lower opening of the wafer. The cylinder extends vertically from the bottom of the wafer along the same central vertical axis as the cone. This cylindrical extension provides additional surface area to retain and adhere to the handle. Other shapes and cross sections, such as oval or square (making the wafer appear more like a hollow pyramid than a cone) are permissible and completely within the scope of this invention.

Figure 2:
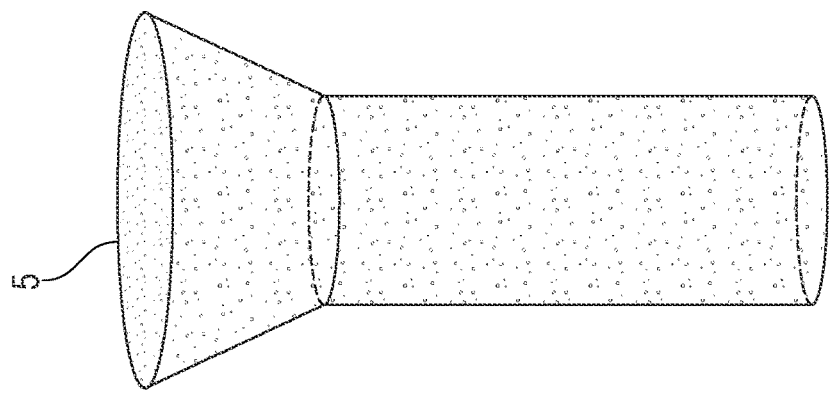
FIG. 2 is a perspective view of a first embodiment of the handle.

FIG. 2 shows a first embodiment of a handle 5. Handle 5 comprises a solid and edible material, preferably a baked cookie, chocolate or hard candy. Other materials may be substituted as known to those or ordinary skill in this art. Handle 5 has an upper, conical portion, and a lower portion, which can be cylindrical, conical or a cylinder tapering to a cone. The upper, conical portion of handle 5 is dimensioned to fill and nest snugly against lower internal space defined by the wafer. Handle 5 has a circular platform (not numbered) and an exterior lateral surface. The exterior lateral surface of the handle must rest against the interior lateral surface of the wafer. The conical portion of the handle is shorter than that of the wafer. This leaves a cross section at the upper portion of the wafer exposed. The exposed interior lateral surface of the wafer, together with the circular platform, encloses a scoop of ice cream therewithin.

Figure 5:
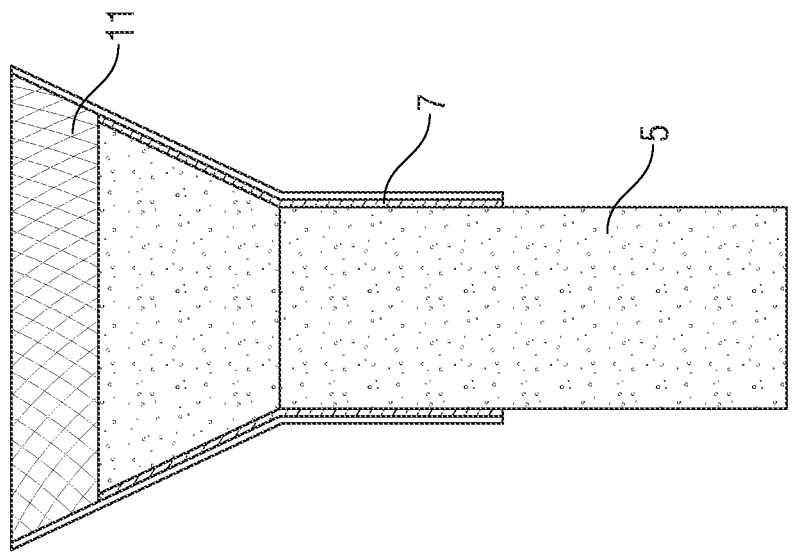
FIG. 5 is a cut-away view of the fully assembled three-part cone shown in FIG. 4.
Figure 4:
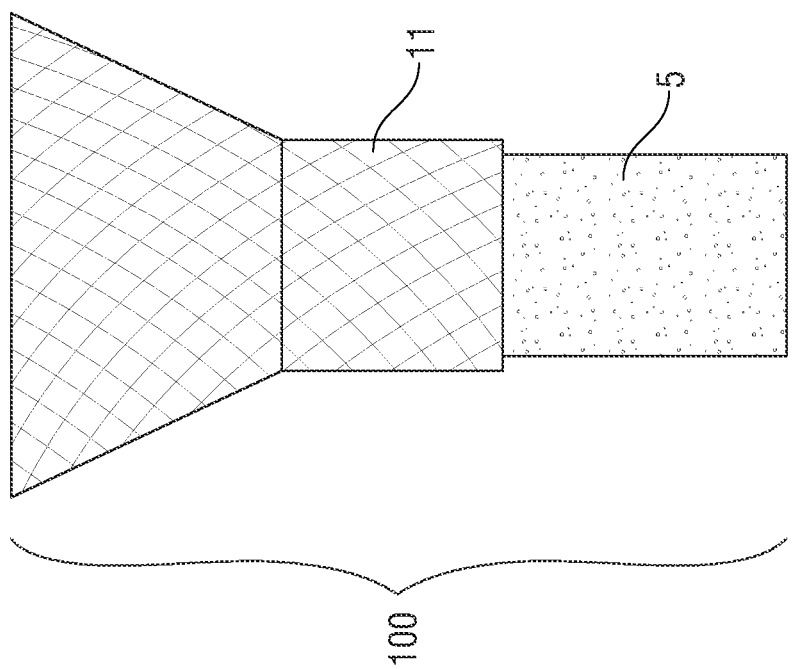
FIG. 4 is a front view of a three-part cone, fully assembled.

The greater the surface area of the wafer contacting the handle, the more edible adhesive that can be applied in this junction, and the stronger the bond between these two components. See, for example, FIGS. 4-5, showing edible adhesive 7 between wafer 11 and handle 5. However, ornamental surface details such as rims and ridges, and other generally planar and perpendicular configurations are possible. The handle must extend beyond the wafer at least long enough for a person to grip it in his palm. Preferably, the handle would extend at least two inches beyond the wafer, but other dimensions are possible and considered within the scope of the invention. The handle should be thick enough to stay intact while a person grips it. Preferably, the handle would have a diameter or thickness of at least one inch, but other dimensions are possible and still considered within the scope of this invention.

If the handle is a solid cookie, a user can bake the desired cookie flavor in a custom designed oven-proof mold pan, not shown, but known to those of ordinary skill in the art. These mold pans accept raw cookie batter and produce solid, three-dimensional cookies in a commercial or conventional oven. If the handle is to be confectionery, whether solid chocolate or hard candy, the melted product is poured into a custom heat-proof mold known to those of ordinary skill in the art and allowed to cool and solidify.

Figure 7:
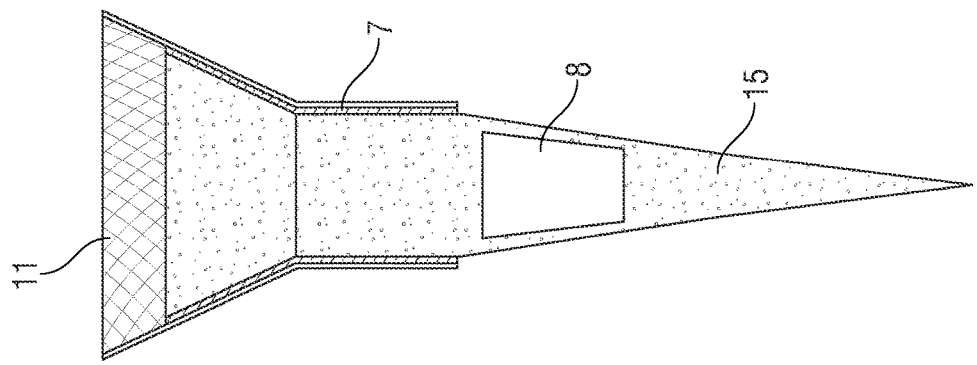
FIG. 7 is a cut-away of the fully assembled three-part cone shown in FIG. 6.
Figure 6:
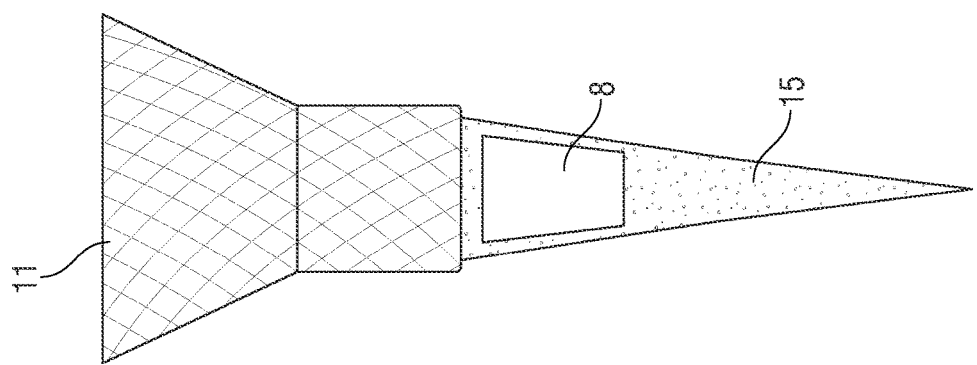
FIG. 6 is a front view of a second embodiment of a three-part cone, fully assembled.

FIGS. 6-7 show the same wafer 11 combined with a second embodiment of the handle 15. Handle 15 is identical to handle 5 except it has three sections instead of two. It is shaped in a truncated cone at an upper portion, in a cylinder at a middle portion and tapers again into a cone at a lower portion. The upper and middle portions are still congruent with and substantially fill the lower space defined by the wafer, except the exposed, lower portion of the handle is a cone instead of a cylinder. There is an option to affix or emboss indicia 8 on the exposed handle 15, or on any handle variation. The indicia may be edible or not.

Figure 9:
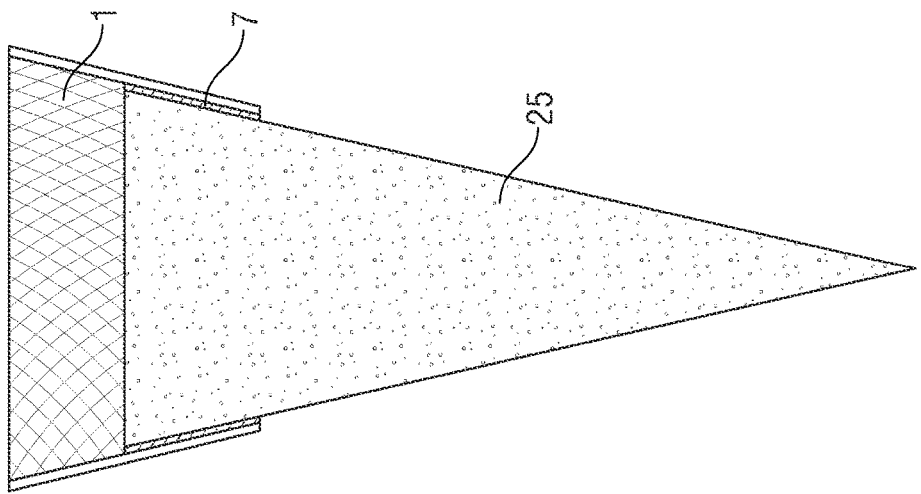
FIG. 9 is a cut-away view of the fully assembled three-part cone shown in FIG. 8.
Figure 8:
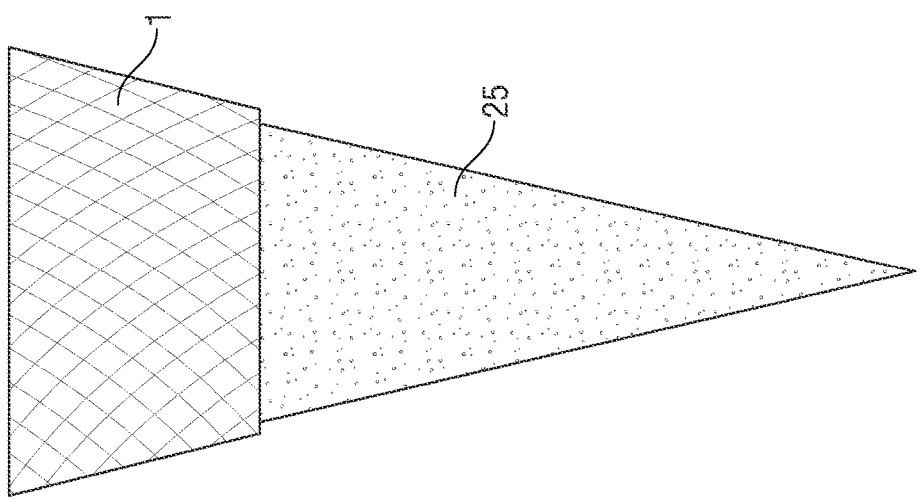
FIG. 8 is a front view of a third embodiment of a three-part cone, fully assembled.

Another combination of wafer and handle shape is shown in FIGS. 8-9. Here, a solid cone shaped handle 25 is inserted into and fills the lower interior space defined by wafer 1 and joined by edible adhesive 7. Handle embodiment 45 is congruent with either the first 1 or the second 11 wafer and is shown in FIGS. 14-17. Fifth handle embodiment 45 has a shorter and rounded lower portion.

FIGS. 10-13 show a third wafer embodiment 21 which is not a regular truncated cone, but has a circumferential bulge protruding outward perpendicular relative to the vertical axis. This bulge is designed to accommodate an optional handle topper 9. The topper 9 presents yet another place to add different tastes and textures and further serves to secure the handle in its position and thereby also secure the ice cream scoop. The topper sits atop or is integral with third handle 35, which is identical to second handle 25, except 35 is shorter along its central axis than 25. Topper 9 preferably comprises a sticky or gummy confection. In FIG. 12, topper 19 shows a ring-shaped variation. In the ring-shaped variation, one can see the top of the handle through the hole in the topper. In FIG. 13, topper 29 shows a flat, disk-shaped variation, through which you cannot see the handle. Topper 9, 19 or 29 comprise gummy candy, chewing gum, marshmallow or licorice, but other similarly sticky and gummy textured comestibles can be substituted and still be within the scope of this invention.

The edible adhesive will not only add yet another dimension of flavor, but also will further prevent ice cream from dripping. Preferably, the edible adhesive comprises melted chocolate or melted white chocolate, whipped cream, marshmallow fluff, peanut butter, other nut butters, jellies and jams, frosting, caramel, and nougat, although other similar spreadable sticky ingredients can be used and only limited by the creator's imagination. Savory spreads like cheese could also be used. See FIGS. 5, 7, and 9 to see the preferred placement of "adhesive," although other placements are possible.

We claim:

1. An ice cream support assembly, comprising:
   a. An edible wafer shaped in a truncated right cone having a central vertical axis, a wider, upper opening, a narrower, lower opening, and an interior lateral surface defining an interior space therewithin;
   b. a solid, and not hollow, edible handle comprising a right cone with a circular platform and an exterior lateral surface, this handle dimensioned to snugly fill the interior space of the wafer and leave a vertical cross section of the interior space at the upper opening unfilled, then pass through and extend beyond the lower opening of the wafer, wherein the circular platform of the handle, together with the interior lateral surface of the wafer extending above the circular platform defines an enclosure supporting and surrounding a scoop of ice cream therewithin; and
   c. an edible and spreadable adhesive spread between and sealing the interior lateral surface of the wafer to the exterior lateral surface of the handle.

2. The ice cream support assembly of claim 1, wherein the lower opening of the wafer further comprises a hollow cylindrical neck depending therefrom.

3. The ice cream support assembly of claim 2, wherein the handle extends through and snugly fills, then extends beyond, the hollow cylindrical neck.

4. The ice cream support assembly of claim 3, wherein the handle extends beyond the hollow cylindrical neck of the wafer into a cone shape.

5. The ice cream support assembly of claim 3, further comprising adhesive sealing the wafer to the handle within the cylindrical neck.

6. The ice cream support assembly of claim 1, wherein the handle extends beyond the lower opening of the wafer into a cone shape.

7. The ice cream support assembly of claim 1 wherein the handle comprises a baked cookie, toasted rice cereal-marshmallow material or a granola bar.

8. The ice cream support assembly of claim 1, wherein the handle comprises a solid, and not hollow, confection of chocolate or another candy.

9. The ice cream support assembly of claim 1, wherein the edible and spreadable adhesive comprises: melted chocolate, melted white chocolate, chocolate syrup, whipped cream, marshmallow fluff, nut butters, seed butters, jelly, jam, frosting, caramel, nougat, cheese, and combinations thereof.

10. The ice cream support assembly of claim 1, wherein the wafer further comprises a circumferential bulge protruding outward perpendicular to the central vertical axis.

11. The ice cream support assembly of claim 10, further comprising an edible topper resting on the circular platform of the handle.

12. The ice cream support assembly of claim 11, wherein the edible topper further comprises gummy candy, licorice, chewing gum or marshmallow.

\* \* \* \* \*